United States Patent [19]

Umezawa et al.

[11] 4,009,155
[45] Feb. 22, 1977

[54] P-CARBOXYPHENYL-AZOXYCARBONI-TRILE AND ITS METHYL ESTER

[75] Inventors: Hamao Umezawa; Tomio Takeuchi; Hironobu Iinuma, all of Tokyo; Osamu Tanabe, Kowata Ugi, all of Japan

[73] Assignee: Zaidan Hojin Biseibutsu Kagaku Kenkyu Kai, Japan

[22] Filed: Sept. 5, 1974

[21] Appl. No.: 503,553

[30] Foreign Application Priority Data

Sept. 14, 1973 Japan .......................... 48-103200
Oct. 29, 1973 Japan .......................... 48-120705

[52] U.S. Cl. .......................... 260/141; 195/29; 195/51 R; 260/143
[51] Int. Cl.² .......................... C07C 105/00
[58] Field of Search ............ 260/141, 143, 141 AN

[56] References Cited

UNITED STATES PATENTS

| | | | |
|---|---|---|---|
| 2,119,891 | 6/1938 | Seidenfaden et al. | 260/141 |
| 3,597,414 | 8/1971 | Gruffaz et al. | 260/143 |
| 3,819,609 | 6/1974 | Puklics et al. | 260/141 |

OTHER PUBLICATIONS

Alfieri et al., Chem. Abs. vol. 75, 1971, 109084e.
Rodionow et al., Bull. Soc. Chem. [5], vol. 4, p. 1703, (1937).
Freeman, The Nuclear Magnetic Resonance Spectra & Structure of Aliphatic Azoxy Compounds, vol. 28, pp. 2508–2511 in *Structure of Aliphatic Azoxy Compounds*, Oct., 1943.
"A New Antibiotic, Calvatic Acid", *J. Antibiotics*, 28 (1) 87–90 (1975).
Gasco et al., "An Antibacterial and Antifungal Comp'd from Calvatia Lilacina", Tetrahedron Ltrs., 3431–3432 (1974).

*Primary Examiner*—Allen B. Curtis
*Attorney, Agent, or Firm*—Herbert W. Taylor, Jr.

[57] ABSTRACT

There is disclosed a new antibiotic called calvatic acid having the structure p-carboxyphenyl-azoxycarbonitrile and processes for its production by fermentation and processes for its recovery and purification. This substance is effective in inhibiting the growth of Gram-positive bacteria and carcinoma.

5 Claims, No Drawings

4,009,155

P-CARBOXYPHENYL-AZOXYCARBONITRILE AND ITS METHYL ESTER

BACKGROUND OF THE INVENTION

This invention relates to chemical compounds produced by fermentation and used to inhibit the growth of Gram-positive bacteria and carcinoma. SUMMARY OF THE INVENTION This invention relates to a new antibiotic called calvatic acid and processes for the production and preparation thereof. More particularly, it relates to processes for its production by fermentation and processes for its recovery and purification. This invention embraces this antibiotic and its salts in dilute solutions, as crude concentrates, as crude solids, as purified solids and in pure crystalline forms. This substance is effective in inhibiting the growth of Gram-positive bacteria and carcinoma.

There is now provided, according to the present invention, an antibiotic named calvatic acid, its salts and its esters effective in inhibiting bacteria and carcinoma, said chemotherapeutic agent being soluble in methanol, ethanol, propanol, butanol, acetone and dimethyl sulfoxide, slightly soluble in ethyl acetate, butyl acetate, benzene, chloroform and ethyl ether, and insoluble in hexane, showing in its ultraviolet absorption spectrum a maximum at 306 nm in methanol, a maximum at 304 nm in its 0.01 N HCl solution, and a maximum at 276 nm in its 0.01 N NaOH solution, giving positive reactions to picryl chloride-ammonium nitroprusside-potassium ferricyanide and potassium permanganate reagents, but negative reactions to Sakaguchi, Ehrlich, Liebermann-Burchard, Rydon-Smith and ninhydrin reagents, giving crystals which melt at 182°–185° C., showing pKa' of 3.2 by titration of its aqueous solution, having the molecular formula of $C_8H_5N_3O_3$, exhibiting characteristic absorption bands in the infrared region of the spectrum when pelleted with potassium bromide at the following wave numbers in $cm^{-1}$: 3450, 3100–2500, 2360, 1690, 1600, 1475, 1425, 1325, 1315, 1295, 1110, 1015, 940, 875, 810, 780, 700 and having the following structure:

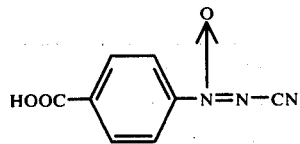

There is further provided, according to the present invention, the process for production of calvatic acid which comprises cultivating a calvatic acid-producing microorganism in an aqueous medium containing carbon sources and nitrogen sources under aerobic conditions until there is accumulated a substantial amount of calvatic acid in said solution. Calvatic acid in the cultured broth can be measured by its antibacterial activity or by spectrophotometric determination.

Calvatic acid is a new compound discovered by the present inventors. The organism producing calvatic acid was first found by the present inventors and collected in Manaus, Brazil in May, 1969. It is a kind of mushroom. It was cultivated and designated strain K414 in the inventors' institute (Institute of Microbial Chemistry, Shinagawa-ku, Tokyo). It was identified as Calvatia craniformis (Shw.) Fr. It has been deposited in the American Type Culture Collection in Washington, D. C., U.S.A. and added to its permanent collection as No. 20424.

The present invention also provides processes for the recovery and purification of calvatic acid. The assay method for determining the antibacterial activity of calvatic acid is also useful to establish efficient processes for its extraction and its purification. The words "calvatic acid-producing strain" employed in the present invention embraces the strain K414 and all variants and all mutants thereof. It embraces all organisms which produce calvatic acid and cannot be definitely differentiated from the strain K414, its variants and its mutants.

According to the present invention, calvatic acid is produced by cultivating the calvatic acid- producing strain under aerobic conditions with known methods for cultivating mushroom mycelia. For the production of calvatic acid, cultivation on solid medium is possible, but for production of large quantity submerged cultivation in a liquid medium is preferred. For instance, calvatic acid is also produced by cultivating the calvatic acid-producing strain after inoculating the calvatic acid-producing strain to a medium directly from the slant culture which has been subcultured on an agar medium consisting of 2% glucose, 0.5% dried yeast and 1.5% agar (pH is not adjusted, pH is usually about 5.6 sterilization at 120° C. for 20 minutes). However, it is desirable to prepare a seed culture: calvatic acid-producing strain is inoculated to the fermentation medium from the above slant culture, and cultured under a stationary condition until its mycelial growth occurs relatively well (for instance, for 15–30 days), and then shake-cultured. The calvatic acid-producing strain can grow at 15° C. or 35° C., but it is desirable for production of calvatic acid to maintain the medium at 25° C. or 30° C.

All known nutrients for cultivating mushroom mycelia and other microorganisms can be employed in the present invention to cultivate the calvatic acid-producing strain. For instance, glucose, maltose, dextrin, starch and sucrose can be employed as carbon sources. Vegetable oils such as soybean oil and the like and animal oils such as lard and the like can be employed not only as anitfoaming agents but also as carbon sources to produce calvatic acid.

As explained later, calvatic acid possesses so high a content of nitrogen atoms in its molecule that all known nitrogen sources for the cultivating mushroom mycelia and other microorganisms can be employed to produce calvatic acid. For instance, peptone, meat extract, yeast, yeast extract, soybean meal, cotton-seed meal, peanut meal, corn steep liquor, rice bran and inorganic nitrogen can be employed as nitrogen sources.

As disclosed by the present invention calvatic acid is soluble in methanol, ethanol, butanol, ethyl acetate, butyl acetate, dimethyl sulfoxide and alkaline water, and it is extracted into water-immiscible solvents at acidic or weak acidic condition and extracted particularly efficiently with n-butanol. From the butanol extract calvatic acid is extracted into weakly alkaline water efficiently. Thus calvatic acid can be extracted with organic solvents from the culture filtrate and can be concentrated by removal of the solvent under reduced pressure. To the concentrate, methanol is added to dissolve calvatic acid. Methanol-insoluble residue in the concentrate can be separated from the methanol solution of the concentrate by centrifugation or filtration. The calvatic acid in the methanol solution is recovered by concentration under reduced pressure. Calvatic acid in the concentrate is purified efficiently on a silica gel column (silicic acid, 100 mesh, Mallinckrodt Chemical Work) by adsorbing it on a silica gel column and then eluting with benzene-methanol mixture. After active fractions of eluate are concentrated under reduced pressure, it is further purified by the silica gel column chromatography as above mentioned, eluting with chloroform. Faint brownish crystals of calvatic acid are obtained by dissolving the concentrated active fractions in a small volume of acetone and adding hexane to the solution until the mixture becomes a little cloudy, and cooling it.

As mentioned above, with the present invention, calvatic acid is extracted and purified by extraction with organic solvents and adsorption chromatography technique and, if desired, obtained as a crystalline form.

Calvatic acid occurs as faint brownish crystals, which were crystallized from the mixture of hexane or benzene and acetone and melted with decomposition at 182°–185° C. It has the formula of $C_8H_5N_3O_3$ (elemental analysis: found: C, 50.93; H, 2.79; N, 21.39, 0, 24.89%; calcd.,; C, 50,26; H, 2.64, N, 21.99, 0, 25.11%). Calvatic acid was determined to have a molecular formula of $C_8H_5N_3O_3$ after the analytical results on high resolution mass spectrometry (m/e 191). Calvatic acid is soluble in methanol, ethanol, propanol, butanol, dimethyl sulfoxide, acetone and alkaline water and slightly soluble in ethyl acetate, butyl acetate, benzene, chloroform and ethyl ether, and insoluble in hexane.

The ultra-violet absorption spectra of calvatic acid at the concentration of 10 mcg./ml. in methanol shows maximum at 306 nm ($\epsilon$13,000), and in 50% methanol with 0.01 N HCL at 304 nm ($\beta$15,600), and in 50% methanol with 0.01 N NaOH at 276 nm ($\epsilon$12,000).

Th infrared absorption spectrum (KBr) shows absorption bands at 3450, 3100–2500, 2160 (CN), 1690 (COOH), 1600, 1475, 1425, 1325, 1315, 1295, 1110 1015, 940, 875, 810, 780 and 700 cm$^{-1}$.

Calvatic acid possesses an acidic function and its value of pKa' is 3.2 by titration.

It exhibits a positive reaction in picryl chloride-ammonium, nitroprusside-potassium ferricyanide and potassium permanganate tests and exhibits a negative reaction in Sakaguchi, Ehrlich, Liebermann-Burchard, Rydon-Smith and ninhydrin tests.

On thin-layer chromatography, Rf values of calvatic acid are the following: about 0.80 on Silica gel G (Merck) with a solvent system of butanol-acetic acid-water (4:4:1 in volume); about 0.60 on Silica gel H (Mallinckrodt) with a solvent system of benzene-ethanol (5:1 in volume).

The presence of one carboxyl group in calvatic acid is indicated by the infrared absorption spectrum and pKa' value. Treatment of calvatic acid with diazomethane afforded colorless needles of its methyl ester melting at 108°–109° C. Elemental analysis: found: C, 52.46; H, 3.47; N 20,15; calcd. for: $C_9H_7H_3O_3$: C, 52.68; H, 3.44; N, 20.48. In the infrared absorption spectrum of its methyl ester, an absorption band at 1690 cm$^{-1}$ (COOH) disappeared, and an asborption band at 1725 cm$^{-1}$ (ester) appeared in comparison with the infrared absorption spectrum of calvatic acid.

In the nuclear magnetic resonance spectrum of the methyl ester a peak at 3.99 p.p.m. (CDCl$_3$) was observed; it was identified as the methyl group of calvatic acid methyl ester.

Degradation of calvatic acid in 1 N HCl containing 10% of methanol under reflux for 15 hours followed by silicic acid chromatography gave p-hydroxy-benzoic acid, melting at 210°14 211° C., which was identified by comparison with the infrared spectrum of an authentic sample. Elemental analysis: found: C, 61.03; H, 4.76; N, 0.0 m/e 138; calcd. for $C_7H_6O_3$: C, 60.87; H, 4.38, m.w., 138. The data on high resolution mass spectrum of calvatic acid methyl ester is as follows:

| High resolution mass spectrometry of calvatic acid | | |
|---|---|---|
| m/e | | |
| Obs. | Calcd. | Formula |
| 205.0485 | 205.0486 (M$^+$) | C$_9$H$_7$N$_3$O$_3$ |
| 189.0528 | 189.0537 | C$_9$H$_7$N$_3$O$_2$ |
| 165.0420 | 165.0424 | C$_8$H$_7$NO$_3$ |
| 135.0453 | 135.0445 | C$_8$H$_7$O$_2$ |

Based on this spectrum, the structure of calvatic acid as p-carboxyphenylazoxycarbonitrile (following structure) was suggested and confirmed by synethesis.

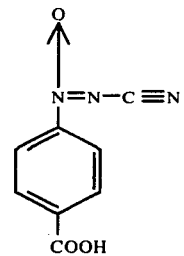

The antimicrobial spectrum of calvatic acid determined by the agar dilution method was as follows:

| Antimicrobial spectrum of calvatic acid | |
|---|---|
| Test microorganisms | MIC (mcg./ml.) |
| Staphylococcus aureus FDA 209P | 6.25 |
| Staphyococcus aureus Smith | 6.25 |
| staphylococcus aureus Terajima | 1.56 |
| Sarcina lutea PCI 1001 | 3.12 |
| Micrococcus flavus FDA 16 | 3.12 |
| Escherichia coli NIHJ | 6.25 |
| Escherichia coli K-12 | 25 |
| Salmonella typhi T-63 | 12.5 |
| Shigella sonnei 191-66 | 6.25 |
| Proteus vulgaris OX 19 | 6.25 |
| Proteus rettgeri GN 311 | 100 |
| Corynebacterium bovis 1810 | 3.12 |
| Bacillus anthracis | 6.25 |
| Bacillus subtilis NRRL B-558 | 12.5 |
| Bacillus cereus ATCC 10702 | 3.12 |
| Pseudomonas aeruginosa A$_3$ | >100 |
| Klebsiella pneumoniae PCI 602 | 12.5 |
| Mycobacterium smegmatic ATCC 607 | >100 |
| Mycobacterium phlei | >100 |
| Candida albicans 3147 | >100 |
| Candida Yu-1200 | >100 |
| Candida pseudotropicalis NI 7494 | >100 |
| Candida krusei NI 7492 | 100 |
| Cryptococcus neoformans NI 7496 | >100 |
| Saccharomyces cerevisiae | >100 |
| Pyricularia oryzae | >100 |
| Helminthosporium oryzae | >100 |
| Xanthomonas oryzae | 3.12 |
| Pellicularia filamentosa | 100 |

-continued

| Antimicrobial spectrum of calvatic acid | |
|---|---|
| Test microorganisms | MIC (mcg./ml.) |
| Trichlphyton asteroides | >100 |
| Pseudomonas fluorescens | >100 |
| Aeromonas salmonicida ATCC 14174 | <0.78 |
| Vibrio anguillarun NCBM 6 | <0.78 |

M.I.C. means Minimum Inhibitory Concentration

As shown above, the antimicrobial activity of calvatic acid is strong against the Gram-positive bacteria, and weak against the Gram-negative bacteria and against the fungi.

Calvatic acid methyl ester also shows strong antimicrobial activity. The antimicrobial spectrum of the calvatic acid methyl ester determined by agar dilution method was follows:

| Antimicrobial spectra of the methyl ester of calvatic acid | |
|---|---|
| Test microorganism | MIC (mcg./ml.) |
| Staphylococcus aureus Smith | 6.25 |
| Sarcina lutea PCI 1001 | 6.25 |
| Micrococcus flavus FDA 16 | 3.12 |
| Escherichia coli NIHJ | 6.25 |
| Escherichia coli K-12 | 6.25 |
| Escherichia coli ML 1629 | 12.5 |
| Salmonella typhi T-63 | 6.25 |
| Proteus vulgaris OX 19 | 3.12 |
| Corynebacterium bovis 1810 | 3.12 |
| Bacillus anthracis | <0.78 |
| Pseudomonas $A_3$ | 50 |
| Pseudomonas No. 12 | >50 |
| Klebsiella pneumoniae PCI 602 | 6.25 |
| Mycobacterium smegmatic ATCC 607 | 3.12 |

As shown above, the antimicrobial activity of calvatic acid methyl ester against the Gram-positive bacteria was almost the same as that of calvatic acid but its antimicrobial activity against the Gram-negative bacteria was clearly stronger than that of calvatic acid.

Calvatic acid showed not only antimicrobial activity but also antitumor activity. It inhibited the growth of Yoshida sarcoma in cell culture by about 50% at a concentration of 1.56 mcg./ml. It also inhibited the growth of L-1210 mouse leukemia. The intraperitoneal injection of 400, 200 and 100 mcg./mouse × 10 of calvatic acid to mice which had been intraperitoneally inoculated 1 × $10^5$ cells of L-1210 mouse leukemia per mouse, prolonged the survival of mice: the survival time was 153%, 147% and 138% of the control, respectively.

Recently, the technique of large scale breeding of fishes has been progressing. In such breeding, one of the most important problems is the therapy of infectious diseases occurring in the fishes. Calvatic acid inhibits especially the growth of Vibrio anguillarum and Aeromonas salmonicida (red disease) which are pathogenic bacteria in fishes.

We expected to use calvatic acid as a chemotherapeutic agent and examined in on red disease. Example: loaches (5–13 cm) were bred in water without soil and after 2–3 days were spontaneously infected by red disease. From them, four strains of pathogenic bacteria were isolated and indentified as belonging to Aeromonas sp. Loaches were bred in water containing 0, 5 or 10 mg./L of calvatic acid with the following results:

| Preventive and curative effect of calvatic acid against red disease of loaches | | | | |
|---|---|---|---|---|
| Expt. | Calvatic acid concentration (mg./L) | Number of Loaches | Breeding day | Percent of death |
| 1 | 0 | 12[1] | 3 | 100 |
|  | 5 | 12[2] | 3 | 33[5] |
| 2 | 0 | 21[3] | 7 | 100 |
|  | 10 | 20[4] | 10 | 15[6] |

[1]seriously infected, 3; slightly infected, 2; normal, 7.
[2]seriously infected, 4; slightly infected, 1; normal, 7.
[3]seriously infected, 1; slightly infected, 0; normal, 20.
[4]seriously infected, 2; slightly infected, 0; normal, 18.
[5]All survivors (67%) died within 4 days after they were transferred to water containing no calvatic acid.
[6]All survivors (85%) lived for more than 30 days after they were transferred to water containing no calvatic acid.

As shown above, in the case of the treatment with 5 mg./L of calvatic acid, infection of the fish by the disease was prevented but not cured. In another case with 10 mg./L, the disease was apparently cured. The invention may be now more fully understood by the following examples which are illustrative of the process and composition of the present invention, but are not to be construed as limiting.

DESCRIPTION OF THE PREFERRED EMBODIMENTS

EXAMPLE 1

For an inoculum preparation, about 0.25 cm² of mycelial growth of calvatic acid-producing strains K414 was inoculated from a slant culture to a medium consisting of 2% glucose, 0.5% peptone, 0.3% yeast extracted, 0.3% $KH_2PO_4$ and 0.3% $MgSO_4.7H_2O$ (pH is 5.6–5.8, not adjusted), and stationarilycultured at 28° C. for 30 days, and successively shake-cultured on a reciprocal shaker at 28° C. for 10 days (130 rpm, 8 cm stroke).

Into 500 ml. volume of flasks, 125 ml. of fermentation broth consisting of the same composition as the above mentioned broth was placed, and sterilized at 120° C. for 20 minutes.

The broth was cooled and 10 ml. of the above inoculant culture was added to it. The organism was shake-cultured on a reciprocal shaker at 28° C. for 10 days (130 cpm, 8 cm stroke).

The cultured broth was filtered, yielding about 15.9 of broth filtrate, and adjusted to pH 2.0 with 2 N HCL. The broth filtrate was extracted with 16 L of n-butanol. The butanol extract was concentrated to dryness under reduced pressure, yielding 25 g. of brownish substance. The brownish substance was dissolved in minimal volume of methanol and then to the methanol solution ethyl acetate was added until a precipitate no longer formed, and the precipitate was separated by filtration. Again the precipitate was dissolved in minimal volume of methanol, and then ethyl acetate was added, and the precipitate formed was separated by filtration. The above filtrates were combined and concentrated under reduced pressure, yielding 8.7 g. of brownish substance.

The brownish substance was charged on a column of silicic acid (100 mesh, Mallinckrodt), and eluted with benzene-butanol (10:1 in volume). Active fractions were collected and concentrated under reduced pressure and 1.54 g. of brownish substance was obtained. This brownish substance was further purified on a similar column of silicic acid. Calvatic acid was eluted with chloroform and the active fractions were collected and concentrated under reduced pressure, yielding 374 mg. of a faint brownish substance. This substance was dissolved in minimal volume of acetone, and then n-hexane was added until the solution became slightly turbid. On keeping the solution in a refrigerator, 30 mg. of calvatic acid was obtained as colorless needles, m.p. 182–183 (decomp.).

EXAMPLE 2

The medium (550 ml.) consistihng of the same composition as described in Example 1 was placed in a 2 L flask and was sterilized at 120° C. for 20 minutes. To the cooled medium about 0.25 cm$^2$ of mycelial growth of calvatic acid-producing strain was inoculated into each flask. The cultivation was carried out at 28° C. for 25 days under the stationary condition, and successively shake-cultured on a rotary shaker at 28° C. for 3 days (100 rpm). This cultured broth (1 L) was inoculated into 25 L of the fresh medium sterilized at 120° C. for 20 minutes, consisting of the same composition as described in Example 1 placed in a 30 L jar fermentor. For the first 3 days, inoculated medium was agitated at a rate of 200 rpm and aerated with a sterile air at a rate of 6.5 L per minute, and then agitated at a rate of 250 rpm and aerated at a rate of 13 L per minute. If necessary, antifoamer (Shin-Etsu Chemical Ind. K606) was added properly. During the culture period, pH drops down gradually and the antimicrobial activity became maximum at the 12th day. At the 13th day of the cultivation period, the broth was filtered, yielding 19 L of the broth filtrate.

The broth filtrate was adjusted to pH 2.0 with HCl and extracted with 20 L of n-butanol. The butanol extract was concentrated under reduced pressure, yielding 80.3 g. of brownish substance. The brownish substance was dissolved in 300 ml. of methanol and then 3 L of ethyl acetate was added. From the mixed solution the insoluble substance was separated by filtration. The insoluble substance was dissolved in 200 ml. of methanol, and then 1.5 L of ethyl acetate was added, and the precipitation formed was discarded by filtration. The filtrates were combined and concentrated under reduced pressure, yielding 28.7 g. of the brownish substance. The browish substance was adsorbed on a column of 300 ml. of silicic acid (100 mesh, Mallinckrodt), and eluted with benzene-methanol (20:1 in volume). Active fractions were collected and concentrated under reduced pressure, yielding 6.66 g. of oily substance.

This substance was further purified on a similar column chromatography using silicic acid. It was eluted with chloroform and active fractions were collected and concentrated to dryness under reduced pressure, yielding 1.61 g. of the crude calvatic acid.

The crude calvatic acid was dissolved in minimal volume of acetone, and then n-hexane was added until the solution became cloudy. The solution was cooled and 795 mg. of calvatic acid was obtained by filtration as light brownish needles, m.p. 184°–185° C.

EXAMPLE 3

Eighty milligrams of calvatic acid obtained in Example 2 was dissolved in 5 ml. of methanol and to this solution an excess of diazomethane in ethyl ether was added at room temperature. The reaction mixture was concentrated to dryness under reduced pressure, yielding the crude calvatic acid methyl ester as light yellow needles. The crude product was recrystallized from ethyl acetate yielding 46 mg. of pure calvatic acid methyl ester as colorless needles, m.p. 108°–109° C.

We claim:
1. The compound having the formula

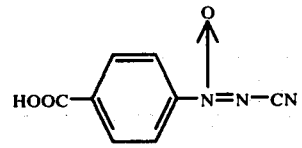

2. A nontoxic pharmaceutically acceptable salt of the compound of claim 1.
3. The acid having the formula

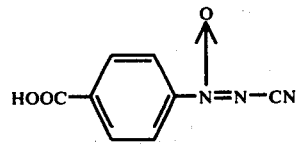

in substantially pure crystalline form.
4. The methyl ester of calvatic acid having the formula

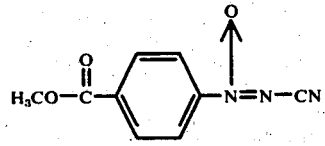

5. The process for producing the compound of claim 4 which comprise reacting the compound having the formula

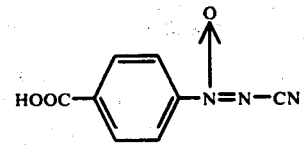

with diazomethane.

* * * * *